US009111365B2

(12) United States Patent
Park et al.

(10) Patent No.: US 9,111,365 B2
(45) Date of Patent: Aug. 18, 2015

(54) EDGE-ADAPTIVE INTERPOLATION AND NOISE FILTERING METHOD, COMPUTER-READABLE RECORDING MEDIUM, AND PORTABLE TERMINAL

(75) Inventors: Hee-Chan Park, Seoul (KR); Min-Kyu Park, Seoul (KR); Han-Sae Song, Seoul (KR); Young-Kwon Yoon, Seoul (KR); Yong-Gu Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 857 days.

(21) Appl. No.: 12/853,853

(22) Filed: Aug. 10, 2010

(65) Prior Publication Data

US 2011/0032396 A1 Feb. 10, 2011

(30) Foreign Application Priority Data

Aug. 10, 2009 (KR) .................. 10-2009-0073442

(51) Int. Cl.
*H04N 5/335* (2011.01)
*G06T 3/40* (2006.01)

(52) U.S. Cl.
CPC .............. *G06T 3/4015* (2013.01); *G06T 3/403* (2013.01)

(58) Field of Classification Search
CPC ........... G06T 5/20; G06T 5/003; G06T 5/002; G06T 2207/10016; G06T 2207/20192; G06T 7/0085; G06T 7/0083; G06T 3/403; G06T 3/4015; H04N 5/142; H04N 9/117; H04N 5/21; H04N 19/46; H04N 5/208; H04N 1/4092
USPC .................................. 348/272–273; 382/261
See application file for complete search history.

(56) References Cited

U.S. PATENT DOCUMENTS

| 5,373,322 | A  | 12/1994 | Laroche et al. |
| 6,130,960 | A  | 10/2000 | Acharya |
| 6,404,918 | B1 | 6/2002  | Hel-or et al. |
| 6,507,364 | B1 | 1/2003  | Bishay et al. |

(Continued)

FOREIGN PATENT DOCUMENTS

| JP | 2008-015946 | 1/2008 |
| JP | 2009-130632 | 6/2009 |
| KR | 1020060131083 | 12/2006 |

OTHER PUBLICATIONS

Jonghwa Lee et al., "Edge-Adaptive Demosaicking for Artifact Suppression Along Line Edges", IEEE Transactions on Consumer Electronics, vol. 53, No. 3, Aug. 1, 2007.

*Primary Examiner* — Twyler Haskins
*Assistant Examiner* — Carramah J Quiett
(74) *Attorney, Agent, or Firm* — The Farrell Law Firm, P.C.

(57) ABSTRACT

An edge-adaptive interpolation and noise filtering method is provided including performing primary interpolation on a first color, based on a first preset number of directions, with respect to a first color window obtained from an input image window, estimating an edge direction within a primary interpolated first color window obtained by the primary interpolation, based on a second preset number of directions, the second preset number of directions being larger than the first preset number, with respect to the primary interpolated first color window, performing secondary interpolation on the first color, based on the estimated edge direction, with respect to the primary interpolated first color window, and performing interpolation on a second color, based on the estimated edge direction, with respect to a second color window obtained from the input image window.

6 Claims, 13 Drawing Sheets

(56) References Cited

U.S. PATENT DOCUMENTS

| | | |
|---|---|---|
| 6,707,937 B1 | 3/2004 | Sobel et al. |
| 6,795,586 B1 | 9/2004 | Gindele et al. |
| 6,816,194 B2 | 11/2004 | Zhang et al. |
| 6,832,009 B1 | 12/2004 | Shezaf et al. |
| 6,875,040 B1 | 4/2005 | O'Keefe et al. |
| 6,882,563 B2 | 4/2005 | Asao |
| 6,933,971 B2 | 8/2005 | Bezryadin |
| 6,970,597 B1 | 11/2005 | Olding et al. |
| 7,053,944 B1 | 5/2006 | Acharya et al. |
| 7,088,392 B2 * | 8/2006 | Kakarala et al. .............. 348/272 |
| 7,133,553 B2 | 11/2006 | Embler |
| 7,256,828 B2 | 8/2007 | Nilsson et al. |
| 7,292,725 B2 | 11/2007 | Chen et al. |
| 7,333,678 B1 | 2/2008 | Huang et al. |
| 7,376,288 B2 | 5/2008 | Huang et al. |
| 2007/0002154 A1 | 1/2007 | Kang et al. |
| 2008/0007630 A1 | 1/2008 | Hara |
| 2009/0135278 A1 | 5/2009 | Aragaki et al. |

\* cited by examiner $x \cos(\theta) + y \sin(\theta) = t$        $G(x,y) = \dfrac{1}{2\pi\sqrt{|\Sigma|}} e^{-\frac{1}{2}(x\Sigma^{-1}x^t)}$ Frequency domain    Spatial domain

EDGE-ADAPTIVE INTERPOLATION AND NOISE FILTERING METHOD, COMPUTER-READABLE RECORDING MEDIUM, AND PORTABLE TERMINAL

PRIORITY

This application claims priority under 35 U.S.C. §119(a) to a patent application filed in the Korean Intellectual Property Office on Aug. 10, 2009 and assigned Serial No. 10-2009-0073442, the entire disclosure of which is hereby incorporated by reference.

BACKGROUND OF THE INVENTION

1. Field of the Invention

The present invention relates generally to a method for acquiring multicolor images by forming a Red, Green, and Blue (RGB) channel or RGB color on each pixel, based on image data entered by passing through a Bayer color filter array, and more particularly, to an edge-adaptive interpolation and noise filtering method performed for the image data.

2. Description of the Related Art

Image sensors used in portable terminals with camera modules include Complementary Metal-Oxide Semiconductor (CMOS) image sensors and Charge-Coupled Device (CCD) image sensors. A CMOS image sensor is used in most cellular phone cameras and also in low-cost digital cameras because it has a high degree of integration and is easily mass-produced. Although the CMOS image sensor has advantages of low cost and low power usage, it is weak in noise. Most of this noise is processed by software to correct pixel values of images output from the image sensor.

A fundamental technique of a picture quality improvement algorithm is to detect an edge within an image and to form an RGB value using neighborhood pixel values, without artifacts for each pixel, in consideration of characteristics of the edge.

Some of the available interpolation and noise filtering methods include interpolation methods considering edge direction and interpolation methods using a noise elimination structure.

For interpolation methods considering edge direction, an edge direction is estimated and interpolation is performed along the estimated edge direction. However, there are various edge analysis methods and interpolation methods using neighborhood pixel values.

For example, edge-adaptive interpolation methods supporting two directions, such as U.S. Pat. No. 5,373,322, which issued to Laroche et al., and is entitled "Apparatus and Method for Adaptively Interpolating a Full Color Image Utilizing Chrominance Gradients", and U.S. Pat. No. 6,507,364, which issued to Bishay et al., and is entitled "Edge-dependent Interpolation Method for Color Reconstruction in Image Processing Devices", disclose interpolation methods for obtaining a gradient by dividing an edge direction for a 3×3 window into horizontal and vertical directions and performing, interpolation using the gradient. Additionally, U.S. Pat. No. 6,882,563, which issued to Asao, and is entitled "Magnetic Memory Device and Method for Manufacturing the Same", discloses a method for eliminating a color fringe by adding a correction step, after performing interpolation similarly to the above-disclosed interpolation methods.

Edge-adaptive interpolation methods supporting four directions, such as U.S. Pat. No. 6,404,918, which issued to Hel-or et al., and is entitled "Image Demosaicing Method Utilizing Directional Smoothing", discloses a method for extracting directions using a steerable filter and iterating interpolation in the extracted direction. Additionally, U.S. Pat. No. 6,832,009, which issued to Shezaf et al., and is entitled "Method and Apparatus for Improved Image Interpolation", discloses an interpolation method for detecting a four-direction edge using a 3×3 Sobel operation.

Further, U.S. Pat. No. 6,707,937, which issued to Sobel et al., and is entitled "Interpolation of Edge Portions of a Digital Image", discloses an interpolation method using 3×3 edge detection of short scale and long scale filtering. U.S. Pat. No. 7,133,553, which issued to Embler, and is entitled "Correlation-based Color Mosaic Interpolation Adjustment Using Luminance Gradients", discloses an interpolation method performed by measuring an edge direction using a 3×3 preset directional filter. U.S. Pat. No. 7,376,288, which issued to Huang et al., and is entitled "Edge Adaptive Demosaic System and Method", discloses a method for performing interpolation in a gradient direction within a threshold after obtaining a gradient value of four edge directions within a 5×5 window.

For interpolation methods using a noise elimination structure, noise may occur due to a Gr/Gb difference or an interpolation direction measurement error. Because it is unstable to accurately measure an edge direction or intensity at a Bayer level, noise is generally eliminated after performing interpolation and then measuring the accurate edge direction and intensity.

For example, U.S. Pat. No. 6,795,586, which issued to Gindele et al., and is entitled "Noise Cleaning and Interpolating Sparsely Populated Color Digital Image", discloses a structure in which color interpolation and noise elimination are processed in one block. U.S. Pat. No. 6,816,194, which issued to Zhang et al., and is entitled "Systems and Methods with Error Resilience in Enhancement Layer Bitstream of Scalable Video Coding", discloses an interpolation method using a boundary of an edge by application of a bilateral filter during a demosaicing process.

Similarly, U.S. Pat. No. 7,256,828, which issued to Nilsson et al., and is entitled "Weighted Gradient Based and Color Corrected Interpolation", discloses a structure using the intensity of an edge as an interpolation weight. U.S. Pat. No. 6,970,597, which issued to Olding et al., and is entitled "Method of Defining Coefficients for Use in Interpolating Pixel Values", discloses a structure for determining a coefficient of a kernel by raising window support during interpolation.

Other interpolation methods include, for example, U.S. Pat. No. 7,292,725, which issued to Chen et al., and is entitled "Demosaicking Method and Apparatus for Color Filter Array Interpolation in Digital Image Acquisition Systems". U.S. Pat. No. 7,292,725 discloses a structure in which a neighborhood pixel value and an interpolation value are tabulated and the interpolation value is retrieved when a specific template is entered.

Additionally, U.S. Pat. No. 6,130,960, which issued to Acharya, and is entitled "Block-matching Algorithm for Color Interpolation" and U.S. Pat. No. 6,933,971, which is issued to Bezryadin, disclose interpolation methods using a weighted average, after analyzing the intensity of a neighborhood pixel.

U.S. Pat. No. 7,053,944, which issued to Acharya, and is entitled, "Method of using hue to interpolate color pixel signals", discloses an interpolation method using a characteristic showing uniform hue value in the same color region.

However, the conventional interpolation and filtering methods above have a number of problems.

First, an edge direction is not accurate detected during edge detection in a Bayer pattern. Because it is important to naturally restore images while preserving a boundary of an edge, it is also important to accurately analyze an edge direction within a given window or block.

Second, inaccurate edge detection may generate noise during interpolation and may damage a detail/texture part during noise elimination. The inaccurate edge detection also affects detail extraction for edge enhancement.

SUMMARY OF THE INVENTION

The present invention is designed to address at least the above-mentioned problems and/or disadvantages and to provide at least the advantages described below. Accordingly, an aspect of the present invention provides an interpolation and noise filtering method that accurately analyzes an edge direction within a given window or block and eliminates noise while preserving detail.

In accordance with an aspect of the present invention, an edge-adaptive interpolation and noise filtering method is provided. The method includes performing primary interpolation on a first color, based on a first preset number of directions, with respect to a first color window obtained from an input image window, estimating an edge direction within a primary interpolated first color window obtained by the primary interpolation, based on a second preset number of directions, the second preset number of directions being larger than the first preset number, with respect to the primary interpolated first color window, performing secondary interpolation on the first color, based on the estimated edge direction, with respect to the primary interpolated first color window, and performing interpolation on a second color, based on the estimated edge direction, with respect to a second color window obtained from the input image window.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described with reference to the accompanying drawings. The following description includes specific details in order to provide a thorough understanding of the present invention. However, it will be apparent to those skilled in the art that the present invention may be practiced without such specific details.

Figure 1:
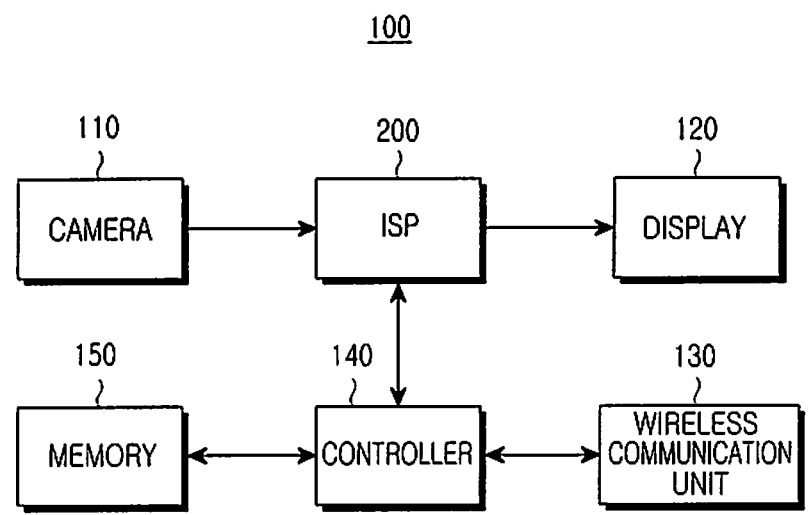
FIG. 1 is a block diagram schematically illustrating a portable terminal for outputting RGB color images based on a Bayer image according to an embodiment of the present invention.

FIG. 1 is a block diagram schematically illustrating a portable terminal for outputting RGB color images in a Bayer image according to an embodiment of the present invention.

Referring to FIG. 1, a portable terminal 100 includes a camera 110, an Image Signal Processor (ISP) 200, a display 120, a wireless communication unit 130, a controller 140, and a memory 150. Although not illustrated in FIG. 1, the portable terminal 100 may also include a speaker, a microphone, a user input device such as a keypad, etc.

The camera 110 captures an image of a subject and converts the formed image into electric signals. Although not shown in FIG. 1, the camera 110 may include a lens system including at least one lens, and an image sensor, such as a CCD or CMOS image sensor.

The display 120 displays an image frame generated from the ISP 200 on a screen. The display 120 may use a Liquid Crystal Display (LCD) or a touch screen. The touch screen displays an image according to the control of the controller 140, generates key contact interruption when a user input means, such as a finger or a stylus pen, contacts thereto, and provides the controller 140 with user input information including input coordinates and input states according to the control of the controller 140.

The wireless communication unit 130 receives a wireless downlink signal through an antenna and transmits downlink data obtained by demodulating the wireless downlink signal to the controller 140. The wireless communication unit 130 generates a wireless uplink signal by modulating uplink data received from the controller 140 and wirelessly transmits the generated wireless uplink signal through the antenna. For example, the modulation and demodulation processes may be performed according to a Code Division Multiple Access (CDMA) scheme, a Frequency Division Multiplexing (FDM) scheme, or a Time Division Multiplexing (TDM) scheme.

The memory 150 stores images. The memory may also store databases associated with user information and documents, background images (menu screen, standby screen, etc.) necessary to drive the portable terminal 100, and operating programs.

The controller 140 executes an application according to user input information.

The ISP 200 processes images received from the camera 110 or images stored in the memory 150 in units of frames, according to the control by the controller 140, and generates an image frame that is converted to be suitable (e.g., have a proper size, picture quality, resolution, etc.) for the display 120. The ISP 200 sets a part of an input image to a window and performs interpolation and noise filtering in units of windows. The window may include a central pixel located at the center of the window and neighborhood pixels adjacent to the central pixel within the window. The window refers to a pixel matrix of a predetermined size, for example, a window of 3×3 pixels to 12×12 pixels.

Commonly, an image signal input to the ISP 200 from the camera 110 is Bayer data. Bayer data refers to RGB data filtered by a Bayer color filter.

Figure 2:
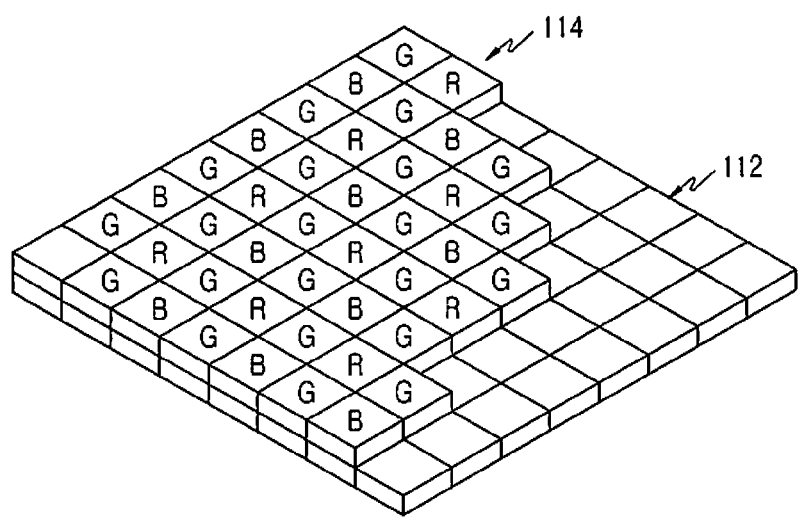
FIG. 2 is a diagram illustrating a partial configuration of a camera as illustrated in FIG. 1, according to an embodiment of the present invention.

FIG. 2 is a diagram illustrating a partial configuration of a camera 110 as illustrated in FIG. 1.

Referring to FIG. 2, the camera 110 includes an image sensor including a pixel array 112 and a Bayer Color Filter Array (CFA) 114 arranged on the pixel array 112. Each pixel generates a value corresponding to the brightness of incident light. The image sensor may have a configuration in which each pixel detects Red (R), Green (G), and Blue (B) colors. However, each pixel typically detects only one color using a color filter due to cost restraints. The image sensor may further include the Bayer CFA 114 arranged on the pixel array 112.

The Bayer CFA 114 includes three-color (R, G, and B) filter units, which alternate with each other in row and column directions. Each of the filter units corresponds to each of the pixels. For example, an R channel passing through an R filter unit is R color and a pixel arranged to correspond to the R filter unit detects the R channel.

Figures 3A, 3B:
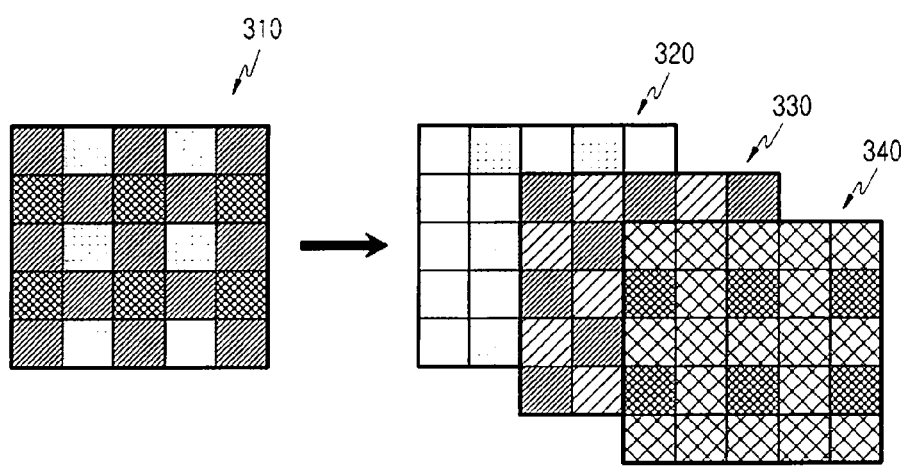
FIGS. 3A and 3B are diagrams illustrating a Bayer image window, and R, G, and B channel image windows interpolated based on the Bayer image window, respectively, according to an embodiment of the present invention.

FIGS. 3A and 3B are diagrams illustrating a Bayer image window 310, and R, G, and B channel image windows 320, 330, and 340, which are interpolated based on the Bayer image window 310, respectively. In FIG. 3A, an R channel is denoted by dots, a G channel is denoted by oblique lines, and a B channel is denoted by checked lines. In FIG. 3B, an original pixel, which is not interpolated, is indicated by a high density of dots or lines and an interpolated pixel is indicated by a low density of dots or lines.

The ISP 200 forms R, G, and B channels on respective pixels based on image data (i.e., a Bayer image) passing through the Bayer CFA 114 and obtains multicolor images (i.e., images obtained by overlapping interpolated R, G and B channel images).

Figure 4:
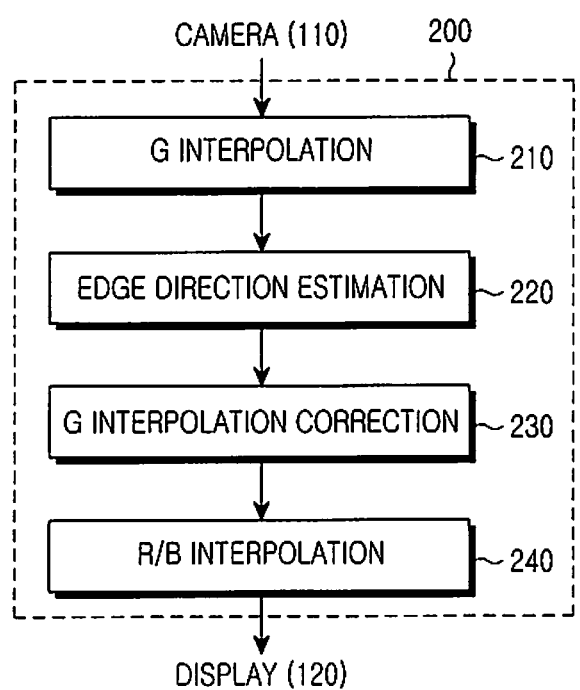
FIG. 4 is a diagram illustrating functional modules of an image signal processor as illustrated in FIG. 1, according to an embodiment of the present invention.

FIG. 4 is a diagram illustrating functional modules of the ISP 200 as illustrated in FIG. 1. The functional modules may correspond to a series of program steps performed by or functional elements within the ISP 200. The ISP 200 includes a G interpolation module 230, an edge direction estimation module 220, a G interpolation correction module 230, and an R/B interpolation module 240.

The G interpolation module 210 performs primary interpolation on a first primary color (G) based on directions (i.e., horizontal and vertical directions) of a first preset number with respect to an input image window. The G interpolation module 210 performs the following operations (i.e., primary interpolation) with a 5×5 Bayer raw data patch indicating pixel values for a 5×5 Bayer window.

Figure 5:
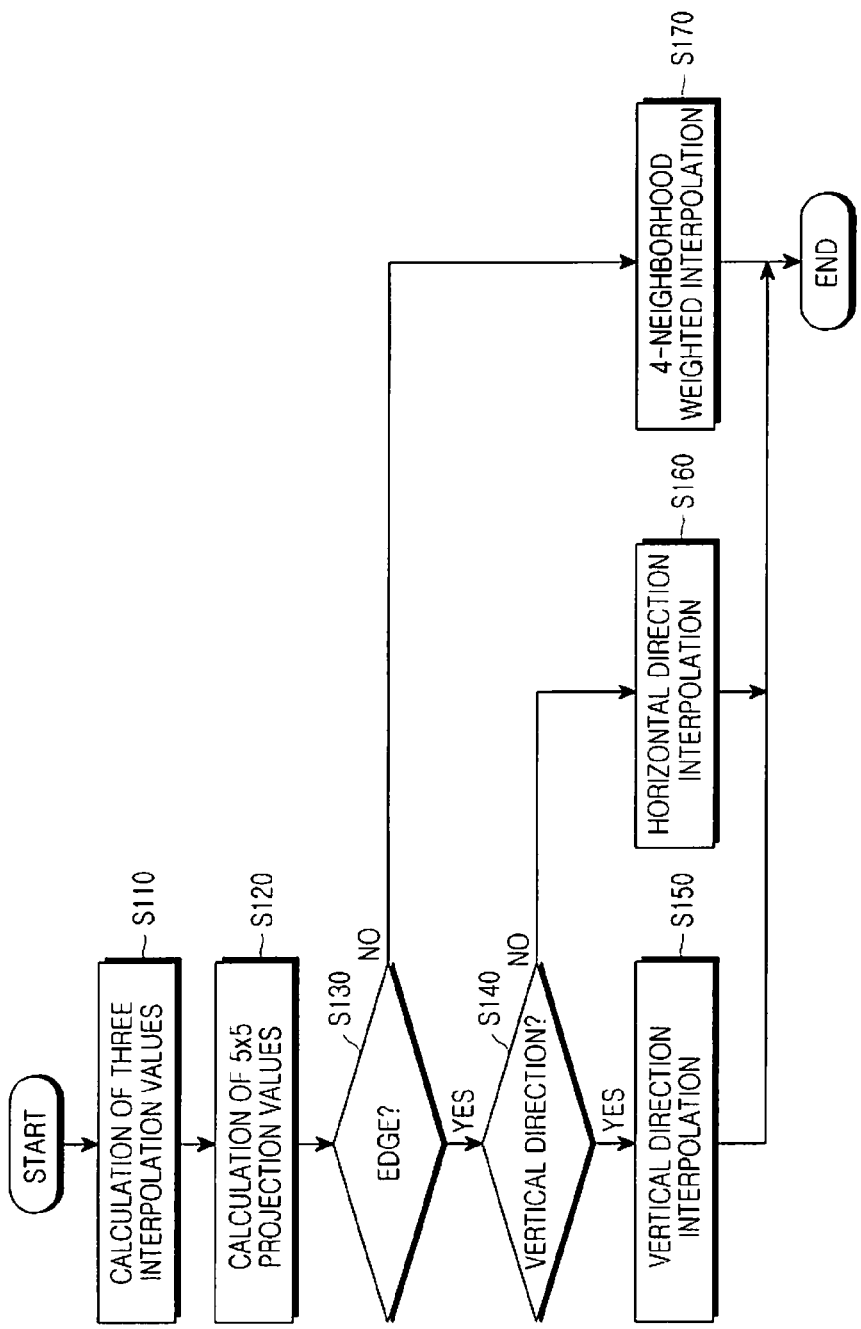
FIG. 5 is a flow chart illustrating a primary interpolation method performed by a G interpolation module as illustrated in FIG. 4, according to an embodiment of the present invention.

FIG. 5 is a flow chart illustrating a primary interpolation method performed for a G channel image (or window) by the G interpolation module 210.

Figure 6:
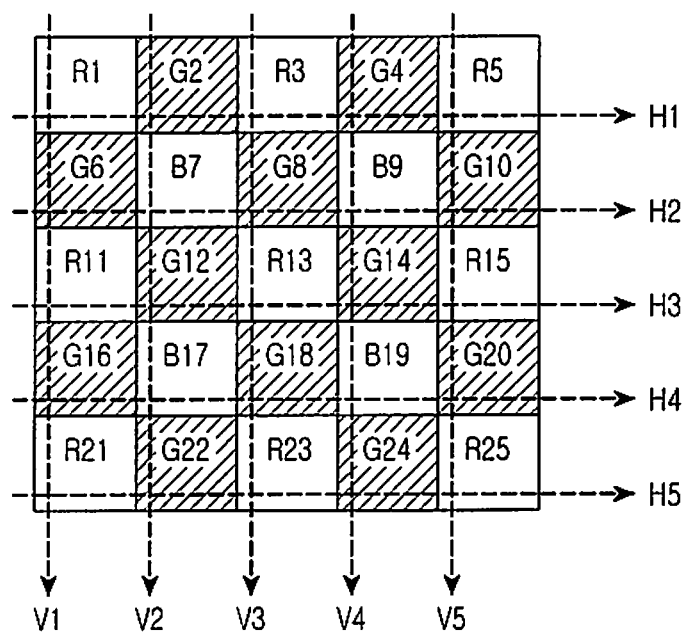
FIG. 6 is a diagram illustrating a two-direction projection operation according to an embodiment of the present invention.

FIG. 6 is a diagram illustrating a two-direction projection operation.

Referring to FIG. 5, the primary interpolation method is for interpolating an empty pixel value of a G channel window by analyzing an edge pattern of a Bayer window. The primary interpolation method includes calculating three interpolation values in step S110, calculating 5×5 horizontal/vertical projection values in step S120, determining an edge in step S130, determining vertical and horizontal direction in step S140, vertical interpolation in step S150, horizontal interpolation in step S160, and 4-neighborhood weighted interpolation in step S170.

More specifically, in step S110, 3×3 2-direction (horizontal/vertical) projection values are calculated. The horizontal/vertical projection is an operation of pixel values in a horizontal or vertical direction with respect to a Bayer window.

FIG. 6, illustrates first to fifth vertical projections V1 to V5 and first to fifth projections H1 to H5.

The G interpolation module 210 calculates 3×3 directional projection values with respect to horizontal and vertical directions.

Vertical Direction $$VV1=(G2+G12)/2+G12+(G12+G22)/2$$

$$VV2=G8+(G8+G18)/2+G18$$

$$VV3=(G4+G14)/2+G14+(G14+G24) \quad (1)$$

Horizontal Direction $$HH1=G6+G8)/2+G8+(G8+G10)/2$$

$$HH2=G12+(G12+G14)/2+G14$$

$$HH3=(G16+G18)/2+G18+(G18+G20)/2 \quad (2)$$

In Equations (1) and (2), VV1, VV2, and VV3 denote values for the second to fourth vertical projections V2 to V4, and HH1, HH2, and HH3 denote values for the second to fourth horizontal projections H2 to H4.

The G interpolation module 210 calculates horizontal and vertical direction weights weight_h and weight_v using the horizontal and vertical projection values.

$$\text{weight\_}h=|HH1-HH2|+|HH3-HH2|$$

$$\text{weight\_}v=|VV1-VV2|+|VV3-VV2| \quad (3)$$

The G interpolation module 210 previously calculates temporary (or candidate) interpolation values for three cases using the vertical and horizontal projection values and the vertical and horizontal direction weights. The three cases are when an edge is in a vertical direction, when an edge is in a horizontal direction, and when there is no edge.

In Equation (4), Green_H denotes a temporary interpolation value for a horizontal direction, Green_V denotes a temporary interpolation value for a vertical direction, and Green_0 denotes a temporary interpolation value for no direction or an arbitrary direction (i.e., in case of no edge or in case of uniform (monochrome) color).

$$\text{Green\_}H=(G12+G14)/2+R13-((R11+R13)/2+(R13+R15)/2)/2$$

$$\text{Green\_}V=(G8+G18)/2+R13-((R3+R13)/2+(R23+R13)/2)/2$$

$$\text{Green\_}0=(\text{weight\_}h*(G12+G14)/2+\text{weight\_}v*(G8+G18)/2)/(\text{weight\_}h+\text{weight\_}v) \quad (4)$$

In step S120, the G interpolation module 210 calculates 5×5 directional projection values for a 5×5 Bayer window using the temporary interpolation values.

In Equation (5), {Green_H, Green_V, and Green_0} are substituted for X.

$$V1=R1+G2+R3+G4+R5$$

$$V2=G2+B7+G12+B17+G22$$

$$V3=R3+G8+X+G18+R23$$

$$V4=G4+B9+G14+B19+G24$$

$$V5=G21+G22+R23+G24+R25$$

$$H1=R1+G2+R3+G4+R5$$

$$H2=G6+B7+G8+B9+G10$$

$$H3=R11+G12+X+G14+R15$$

$$H4=G16+B17+G18+B19+G20$$

$$H5=R21+G22+R23+G24+R25 \quad (5)$$

The G interpolation module 210 calculates a maximum difference value between respective directions. The difference value indicates a difference between pixel values and aids in determination of which direction has a marked contrast.

$$\text{Horizontal\_Max\_Diff}(X)=\max(H1,H2,H3,H4,H5)-\min(H1,H2,H3,H4,H5)$$

$$\text{Vertical\_Max\_Diff}(X)=\max(V1,V2,V3,V4,V5)-\min(V1,V2,V3,V4,V5) \quad (6)$$

In step S130, the G interpolation module 210 determines whether the window includes an edge using Equation (7).

$$|\text{Horizontal\_Max\_Diff}(\text{Green\_}0)-\text{Vertical\_Max\_Diff}(\text{Green\_}0)|<th \quad (7)$$

If Equation (7) has a true value, that is, if a difference between a vertical direction contrast and a horizontal direction contrast is insignificant (i.e., if the difference is less than a threshold value th), the G interpolation module 210 determines that an edge is not included in the Bayer window (i.e., no direction or uniform/monochrome color).

In step S140, the G interpolation module 210 determines whether an edge included in the Bayer window is in a vertical direction or in a horizontal direction using Equations (8) and (9).

$$\text{Horizontal\_Max\_Diff}(\text{Green\_}H)>\text{Vertical\_Max\_Diff}(\text{Green\_}V) \quad (8)$$

If Equation (8) has a true value, that is, if the vertical direction contrast (i.e., Horizontal_Max_Diff(Green_H)) is greater than the horizontal direction contrast (i.e., Vertical_Max_Diff(Green_V)), the G interpolation module 210 deter mines that the edge included in the Bayer window is in a horizontal direction.

$$\text{Horizontal\_Max\_Diff}(\text{Green\_}H)<\text{Vertical\_Max\_Diff}(\text{Green\_}V) \quad (9)$$

If Equation (9) has a true value, that is, if the horizontal direction contrast is greater than the vertical direction contrast, the G interpolation module 210 determines that the edge included in the Bayer window is in a vertical direction.

For example, if an edge pattern, an upper half of which is dark and a lower half of which is bright, is present in the Bayer window, the horizontal direction contrast, i.e., a difference between left and right pixel values, will be insignificant and the vertical direction contrast, i.e., a difference between upper and lower pixel values, will be significant.

In steps S150, S160, and S170, the G interpolation module 210 allocates the temporary interpolation value of an estimated direction to a central pixel of the G channel window according to the edge direction (horizontal or vertical direction, or no direction) estimated through the above-described processes.

$$G13=\{\text{Green\_}H|\text{Green\_}V|\text{Green\_}0\} \quad (10)$$

The G interpolation module 210 allocates the vertical direction interpolation value Green_V to the central pixel in step S150, allocates the horizontal direction interpolation value Green_H to the central pixel in step S160, and allocates the no-direction interpolation value Green_0 to the central pixel in step S170.

Thereafter, the edge direction estimation module 220 estimates an edge direction within the primary interpolated G channel window based on a second preset number (i.e., 8) of directions, larger than the first preset number (i.e., 2).

Figure 7:
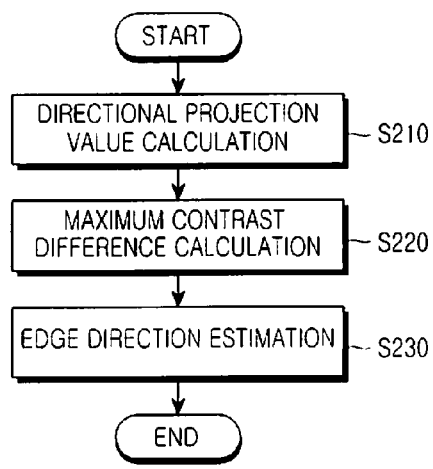
FIG. 7 is a flow chart illustrating an edge direction estimation method performed by an edge direction estimation module as illustrated in FIG. 4, according to an embodiment of the present invention.

FIG. 7 is a flow chart illustrating an edge direction estimation method performed by the edge direction estimation module 220.

Figures 8A, 8B:
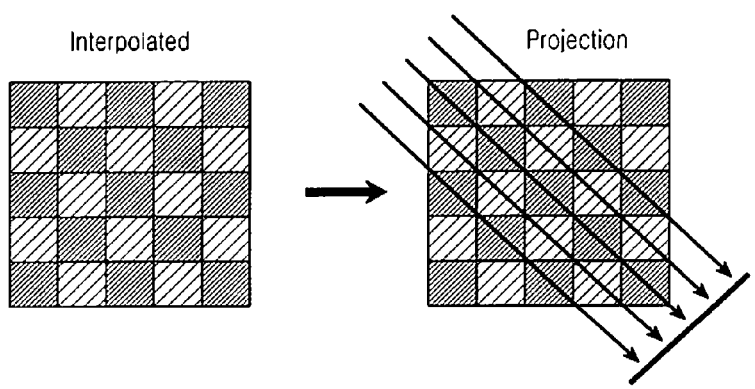
FIGS. 8A and 8B are diagrams illustrating an 8-direction projection operation, according to an embodiment of the present invention.

FIGS. 8A and 8B are diagrams illustrating an 8-direction projection operation.

Referring to FIG. 7, the edge direction estimation method is for estimating an edge pattern within the primary interpolated G channel window with respect to multiple (i.e., 8) directions.

The edge direction estimation module 220 performs the following operations (i.e., edge direction estimation) with pixel values for the primary interpolated G channel window.

In step S210, the edge direction estimation module 220 calculates 8 directional projection values for the primary interpolated 5×5 G channel window. Two directions adjacent to each other among the 8 directions have an angle of 90/4 degrees. That is, if the 5×5 G channel window is expressed by g(x, y), the edge direction estimation module 220 divides an angle of 180 degrees into (2n−2) directions, while maintaining the same angle. In the present embodiment, because n=5, (2n−2) becomes 8.

FIG. 8A illustrates a primary interpolated G channel window and FIG. 8B illustrates one of the 8 directional projections.

The edge direction estimation module 220 calculates 8 directional projection values using Equation (11).

$$dir_{x,y,z} = \int_x \int_y \int_z g(x, y)\delta(\cos x + \sin y - z) \quad (11)$$

In Equation (11), x and y denote pixel coordinates in a 5×5 G channel window and z denotes a distance from a central point (3, 3) of a 5×5 G channel image to each pixel coordinate.

Projection values of respective directions obtained using Equation (II) are shown below in Equation (12).

$dir[0][0]=(g[0][0]+g[0][1]+g[0][2]+g[0][3]+g[0][4])*12;$ $dir[0][1]=(g[1][0]+g[1][1]+g[1][2]+g[1][3]+g[1][4])*12;$ $dir[0][2]=(g[2][0]+g[2][1]+g[2][2]+g[2][3]+g[2][4])*12;$ $dir[0][3]=(g[3][0]+g[3][1]+g[3][2]+g[3][3]+g[3][4])*12;$ $dir[0][4]=(g[4][0]+g[4][1]+g[4][2]+g[4][3]+g[4][4])*12;$ $dir[1][0]=(g[0][0]+g[1][2]+g[2][4])*20;$ $dir[1][1]=(g[1][1]+g[2][3])*30;$ $dir[1][2]=(g[1][0]+g[2][2]+g[3][4])*20;$ $dir[1][3]=(g[2][1]+g[3][3])*30;$ $dir[1][4]=(g[2][0]+g[3][2]+g[4][4])*20;$ $dir[2][0]=(g[0][2]+g[1][3]+g[2][4])*20;$ $dir[2][1]=(g[0][1]+g[1][2]+g[2][3]+g[4][4])*15;$ $dir[2][2]=(g[0][0]+g[1][1]+g[2][2]+g[3][3]+g[4][4])*12;$ $dir[2][3]=(g[1][0]+g[2][1]+g[3][2]+g[4][3])*15;$ $dir[2][4]=(g[2][0]+g[3][1]+g[4][2])*20;$ $dir[3][0]=(g[0][2]+g[2][3]+g[4][4])*20;$ $dir[3][1]=(g[1][2]+g[3][3])*30;$ $dir[3][2]=(g[0][1]+g[2][2]+g[4][3])*20;$ $dir[3][3]=(g[1][1]+g[3][2])*30;$ $dir[3][4]=(g[0][0]+g[2][1]+g[4][2])*20;$ $dir[4][0]=(g[0][0]+g[1][0]+g[2][0]+g[3][0]+g[4][0])*12;$ $dir[4][1]=(g[0][1]+g[1][1]+g[2][1]+g[3][1]+g[4][1])*12;$ $dir[4][2]=(g[0][2]+g[1][2]+g[2][2]+g[3][2]+g[4][2])*12;$ $dir[4][3]=(g[0][3]+g[1][3]+g[2][3]+g[3][3]+g[4][3])*12;$ $dir[4][4]=(g[0][4]+g[1][4]+g[2][4]+g[3][4]+g[4][4])*12;$ $dir[5][0]=(g[0][4]+g[2][3]+g[4][2])*20$ $dir[5][1]=(g[1][3]+g[3][2])*30;$ $dir[5][2]=(g[0][3]+g[2][2]+g[4][1])*20;$ $dir[5][3]=(g[1][2]+g[3][1])*30;$ $dir[5][4]=(g[0][2]+g[2][1]+g[3][0])*20;$ $dir[6][0]=(g[2][4]+g[3][3]+g[4][2])*20;$ $dir[6][1]=(g[1][4]+g[2][3]+g[3][2]+g[4][1])*15;$ $dir[6][2]=(g[0][4]+g[1][3]+g[2][2]+g[3][1]+g[4][0])*12;$ $dir[6][3]=(g[0][3]+g[1][2]+g[2][1]+g[3][0])*15;$ $dir[6][4]=(g[0][2]+g[1][1]+g[2][0])*20;$ $dir[7][0]=(g[2][4]+g[3][2]+g[4][0])*20;$ $dir[7][1]=(g[2][3]+g[3][1])*30;$ $dir[7][2]=(g[1][4]+g[2][2]+g[3][0])*20;$ $dir[7][3]=(g[1][3]+g[2][1])*30;$ $dir[7][4]=(g[0][4]+g[1][2]+g[2][0])*20 \qquad (12)$ In Equation (12), constants such as '12', '15', '20' and '30' are values multiplied to obtain a common multiple necessary for obtaining the projection values of respective directions.

In step S220, the edge direction estimation module 220 calculates a maximum difference value between respective directions. The maximum difference value denotes a difference between pixel values and aids in a determination of which direction has a marked contrast. Namely, the edge direction estimation module 220 calculates a projection value showing the greatest difference, i.e., a maximum contrast difference, between the projection values obtained according to respective directions. This is given by Equation (13).

$$\text{diff}_{ij}=\max(dir_{i,j,k}-dir_{i,j,l}) \qquad (13)$$

In Equation (13), i and j denote pixel coordinates, and k and l denote z values.

In step S230, the edge direction estimation module 220 detects an edge direction using the maximum contrast difference. Such an edge direction is calculated using Equation (14).

$$dir=\arg max_p(|\text{diff}_{p-1}/2+\text{diff}_p+\text{diff}_{p+1}/2)-(\text{diff}_{p+3}/2+\text{diff}_p=4+\text{diff}_{P+5}/2)|) \qquad (14)$$

In Equation (14), p denotes an angle value of a projection direction.

The edge direction estimation module 220 calculates the angle value p of the edge direction satisfying Equation (14). The angle value p corresponds to an edge direction. The edge direction estimation module 220 determines the angle value p calculated using Equation (14) as the edge direction.

The G interpolation correction module 230 performs a secondary interpolation on the primary interpolated G channel window based on the estimated edge direction with respect to the primary interpolated G channel window. That is, the G interpolation correction module 230 analyzes the estimated edge direction and a projection frequency of the edge, intensifies interpolation in the edge direction by applying a 5×5 adaptive Gaussian filter, and eliminates noise. The application of the adaptive Gaussian filter refers to adjusting a Gaussian smoothing filter by analyzing a two-Dimensional (2D) frequency and direction of a signal.

Figure 9:
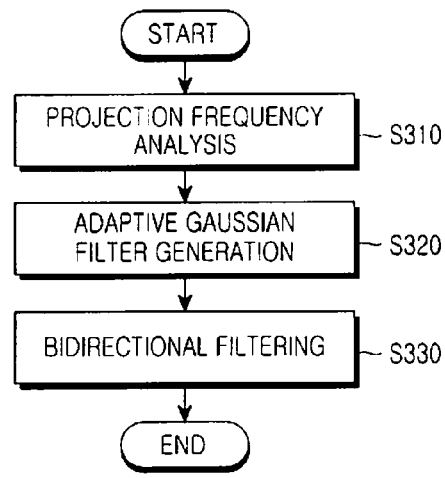
FIG. 9 is a flow chart illustrating a secondary interpolation method performed by a G interpolation correction module as illustrated in FIG. 4, according to an embodiment of the present invention.

FIG. 9 is a flow chart illustrating a secondary interpolation method performed by the G interpolation correction module 230 as illustrated in FIG. 4.

Figures 10A, 10B:
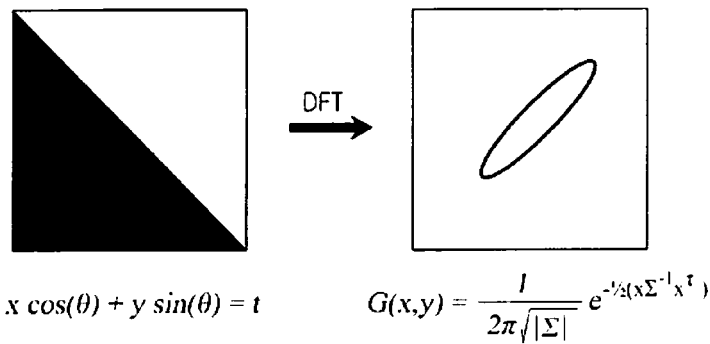
FIGS. 10A and 10B are diagrams illustrating a projection frequency analysis process, according to an embodiment of the present invention.

FIGS. 10A and 10B are diagrams illustrating a projection frequency analysis process.

Figures 11A, 11B:
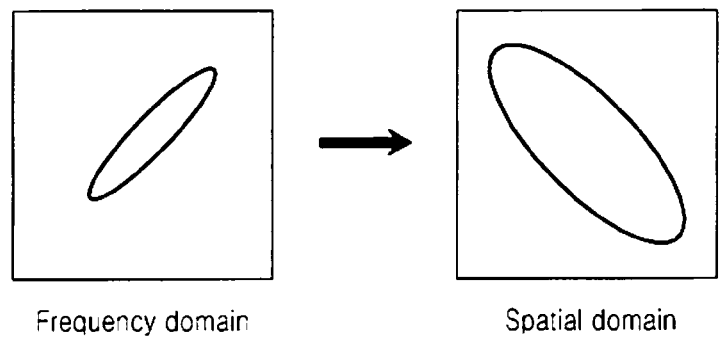
FIGS. 11A and 11B are diagrams illustrating an adaptive Gaussian filter generation process, according to an embodiment of the present invention.

FIGS. 11A and 11B are diagrams illustrating an adaptive Gaussian filter generation process.

In step S310, the G interpolation correction module 230 analyzes the estimated edge direction and a frequency of a projection value of a vertical direction using Equation (15).

That is, the G interpolation correction module 230 approximates, to cosine, a Fourier magnitude of an edge direction in a spatial domain based on a Fourier-slice theorem. This process corresponds to a Discrete Fourier Transform (DFT).

More specifically, the G interpolation correction module 230 measures the strength of an edge direction p using a filter. To measure the strength of the edge direction p, weighted average values of Equation (15) are used. Constants indicated in Equation (15) are filter values for measuring the strength of the edge direction. It will be apparent to those skilled in the art that the filter values may be changed according to design.

$dir\_strength\_1 = |p \otimes \{+0.6152, +0.3485, +0.0000, -0.3485, -0.6152\}|$ $dir\_strength\_2 = |p \otimes \{+0.2265, +0.0000, -0.4531, +0.0000, +0.2265\}|$ $dir\_strength\_3 = |p \otimes \{+0.4570, -0.3485, +0.0000, +0.3485, -0.4570\}|$ $dir\_strength\_4 = |p \otimes \{+0.2265, -0.3398, +0.2265, -0.3398, -0.2265\}|$ The G interpolation correction module 230 defines a 2D Gaussian smoothing filter using Equation (16) and determines a direction and shape of a covariance matrix $\Sigma$.

$$G(x, y) = \frac{1}{2\pi\sqrt{|\Sigma|}} e^{-\frac{1}{2}\left(x \sum^{-1} x^t\right)} \quad (16)$$

In Equation (16), x denotes a coordinate value of a 2D vector.

FIGS. 10A and 10B graphically illustrate DFT in the projection frequency analysis process. More specifically, FIG. 10A is a diagram before DFT and FIG. 10B is a diagram after DFT.

In step S320, the G interpolation correction module 230 converts a Gaussian filter of a frequency domain, as illustrated in FIG. 11A, into an adaptive Gaussian filter of a spatial domain, as illustrated in FIG. 11B, using the above-described projection frequency analysis, intensifies interpolation in an edge direction, and eliminates noise.

The G interpolation correction module 230 determines an eigenvector of a covariance matrix using Equation (17) and defines a principal component of the covariance matrix $\Sigma$ of the 2D Gaussian smoothing filter identically to a predefined projection direction p.

$x \cos(\theta) + y \sin(\theta) = 0 \quad (17)$

In Equation (17), $\theta$ denotes a preset angle p (i.e., one of 8 directions).

The G interpolation correction module 230 determines eigenvalues of a $\theta$ direction and a vertical direction (principal components) of the $\theta$ direction using Equation (18) (as a deviation of a projection frequency cosine coefficient).

$$\sigma_{freq} = \sqrt{\frac{\sum_i (i * freq(i))^2}{\sum_i freq(i)}} \quad (18)$$

In Equation (18), i denotes a frequency index (where $-4 \leq i \leq 4$) and i!=0.

The G interpolation correction module 230 converts $\sigma_{freq}$ of a frequency domain into $\sigma_{spatial}$ of a spatial domain using Equation (19) to calculate a normal distribution.

$$\sigma_{spatial} = \frac{\sqrt{4\ln 2}}{2\ln 2} \sigma_{freq} \quad (19)$$

An area varies according to the directions of two principal vectors and therefore a Gaussian distribution is a circle or elliptical form.

In step S330, the G interpolation correction module 230 combines the adaptive Gaussian filter with a bidirectional filter using Equation (20) and applies the combined filter to the primary interpolated G channel image.

$$f'(x) = \frac{\sum G(x) \cdot g(|c - x|) \cdot f(x)}{\sum G(x) \cdot g(|c - x|)} \quad (20)$$

In Equation (20), G(x) denotes a 2D adaptive Gaussian, c denotes a central pixel value, and g(x) denotes a one-Dimensional (1D) normal distribution.

The R/B interpolation module 240 performs interpolation on second and third primary colors (R and B) based on the secondary interpolated image window and the estimated edge direction.

Figure 12:
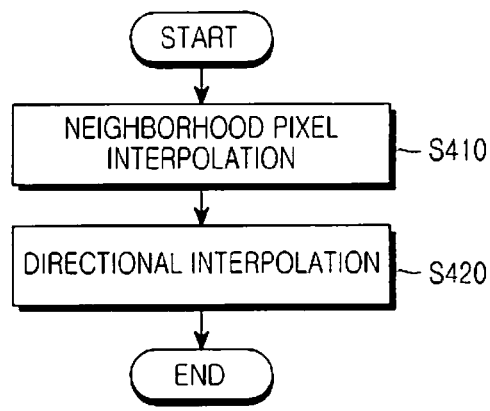
FIG. 12 is a flow chart illustrating an interpolation method for R and B channel images performed by an R/B interpolation module as illustrated in FIG. 4, according to an embodiment of the present invention.

FIG. 12 is a flow chart illustrating an interpolation method for R and B channel windows performed by the R/B interpolation module 240 as illustrated in FIG. 4.

Figure 13:
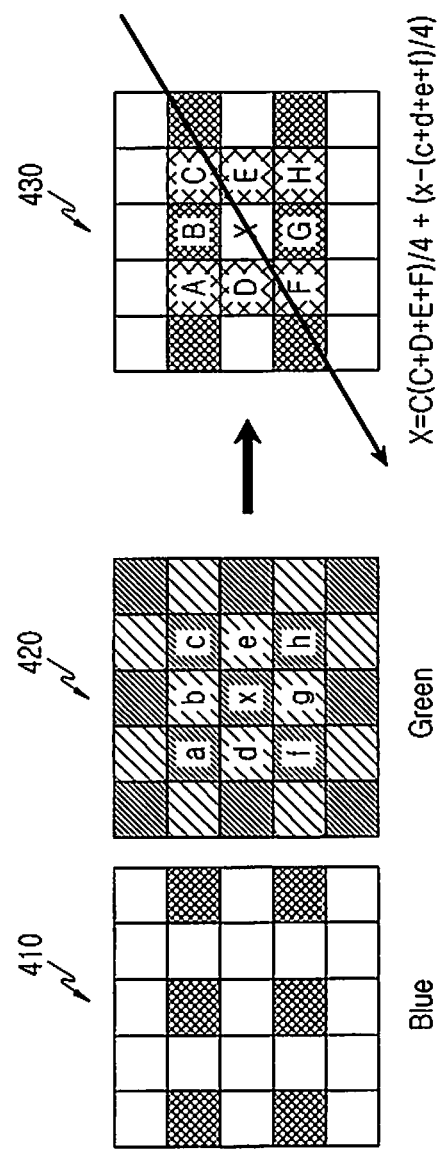
FIG. 13 is a diagram illustrating interpolation of a B channel image using a G channel image according to an embodiment of the present invention.

FIG. 13 is a diagram illustrating interpolation of a B channel window using a G channel window.

For example, in step S410, the R/B interpolation module 240 interpolates 6 neighborhood pixels 'A', 'C', 'D', 'E', 'F', and 'H', which are adjacent to a central pixel 'X', using a secondary interpolated G channel windows 420 (pixel values 'c', 'd', 'e', and 'f') with respect to a B channel window 410, and in step S420, interpolates the central pixel 'X' according to the estimated edge direction using the neighborhood interpolation values as shown in an interpolated B channel window 430.

Figure 14:
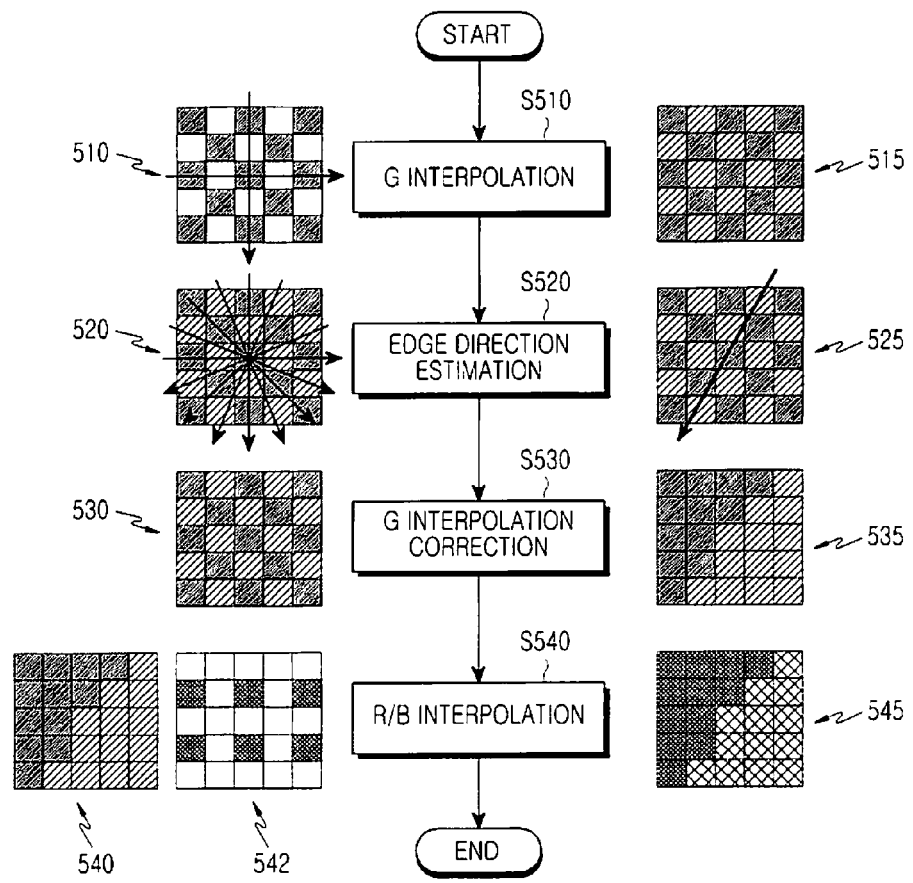
FIG. 14 is a diagram schematically summarizing an edge-adaptive interpolation and noise filtering method according to an embodiment of the present invention.

FIG. 14 is a diagram schematically summarizing an edge-adaptive interpolation and noise filtering method according to an embodiment of the present invention.

Referring to FIG. 14, in step S510 primary interpolation is performed on a G channel window 510 based on two directions (horizontal and vertical directions) to obtain a primary interpolated G channel window 515. In step S520 an edge direction 525 is estimated within the primary interpolated G channel window 515, based on 8 directions 520 with respect to the primary interpolated G channel window. In step S530 secondary interpolation is performed on the primary interpolated G channel window 530, based on the estimated edge direction to obtain a secondary interpolated G channel window 535. In this case, a trilateral filter considering an edge direction, a frequency, and a distance from a central pixel is applied as a noise filter.

In step S540, interpolation is performed on a B or R channel window 542, based on the secondary interpolated G channel window 540 and the estimated edge direction 525, to obtain an interpolated B or R channel window 545.

FIGS. 15A-15C, 16A-16C, and 17A-17C are diagrams illustrating images obtained by an edge-adaptive interpolation and noise filtering method according to the present invention. Here, interpolation using different colors was performed for a Bayer image photographed by an 8-Megapixel image sensor of Sony. However, Automatic White Balance (AWB), gamma, and edge enhancement were maintained at the same value of the same algorithm.

Figures 15A, 15B, 15C:
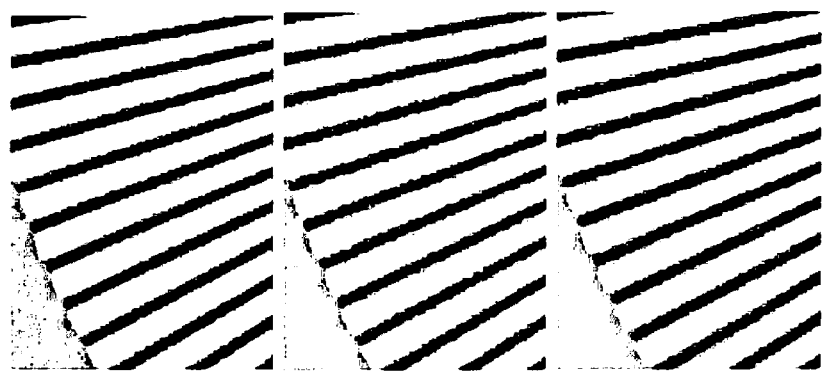
FIGS. 15A-15C, 16A-16C, and 17A-17C are diagrams illustrating images obtained by an edge-adaptive interpolation and noise filtering method according to an embodiment of the present invention.

More specifically, FIG. 15A shows an image according to two-direction edge estimation, FIG. 15B shows an image according to 4-direction edge estimation, and FIG. 15C shows an image according to 8-direction edge estimation. As shown in FIG. 15C, the image according to the 8-direction edge estimation smoothly expresses a high frequency edge of an angle slanted in multiple (8) directions.

Figures 16A, 16B, 16C:
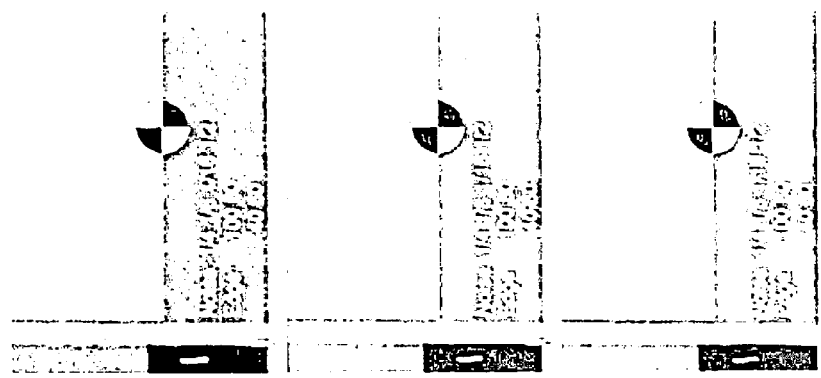

FIG. 16A shows an image according to two-direction edge estimation, FIG. 16B shows an image according to 4-direction edge estimation, and FIG. 16C shows an image according to 8-direction edge estimation. As shown in FIG. 16C, the image according to the 8-direction edge estimation smoothes an edge by interpolation refinement within the same processing block and simultaneously eliminates noise, thereby obtaining a clear image.

Figures 17A, 17B, 17C:
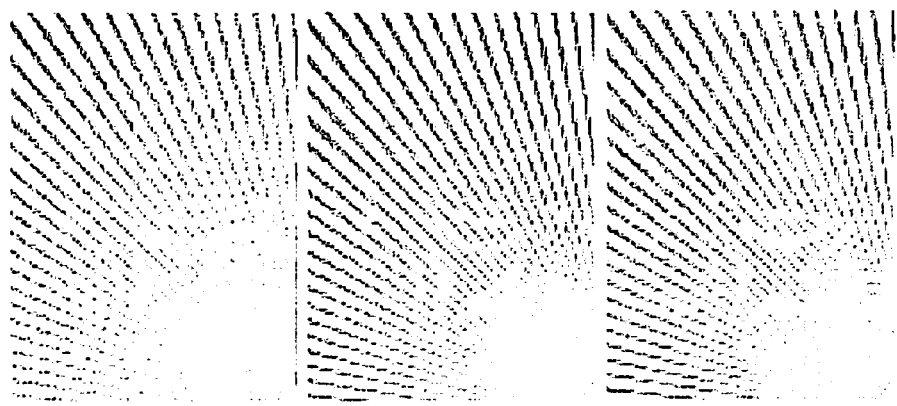

FIG. 17A shows an image according to two-direction edge estimation, FIG. 17B shows an image according to 4-direction edge estimation, and FIG. 17C shows an image according to 8-direction edge estimation. Although R/B interpolation in a wrong direction may deteriorate color noise, the image according to the 8-direction edge estimation can reduce color noise (i.e., fringe) as shown in FIG. 17C.

According to the above-described embodiments of the present invention, adaptive interpolation and noise filtering can accurately analyze an edge direction within a given window so that an image can be naturally restored while preserving an edge boundary, and can eliminate noise while preserving details.

It is apparent that the edge-adaptive interpolation and noise filtering method according to the present invention can be achieved in the form of hardware, software (i.e. a program), or a combination thereof. Such a program may be stored in a volatile or non-volatile recording medium, which can be read by machine such as a computer. The recording medium may be a storage device, such as a Read-Only Memory (ROM), a memory, such as a Random Access Memory (RAM), a memory chip and an integrated chip, or an optical or magnetic recording medium, such as a Compact Disk (CD), a Digital Versatile Disk (DVD), a magnetic disk and a magnetic tape. Namely, the edge-adaptive interpolation and noise filtering method of the present invention may be implemented in the form of a program including codes for achieving the method. Furthermore, the program may be electrically transmitted through an arbitrary medium such as communication signals propagated by wire or wirelessly.

Although certain embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method of edge-adaptive interpolation and noise filtering an image, the method comprising:
   performing primary interpolation on a first color, based on a first preset number of directions, with respect to a first color window obtained from an input image window;
   estimating an edge direction within a primary interpolated first color window obtained by the primary interpolation, based on a second preset number of directions, the second preset number of directions being larger than the first preset number, with respect to the primary interpolated first color window;
   performing secondary interpolation on the first color, based on the estimated edge direction, with respect to the primary interpolated first color window; and
   performing interpolation on a second color, based on the estimated edge direction, with respect to a second color window obtained from the input image window,
   wherein performing the secondary interpolation comprises:
   setting a filter based on the estimated edge direction and an edge frequency; and
   performing the secondary interpolation on the first color, based on the estimated edge direction, by applying the filter to the primary interpolated first color window.

2. The method of claim 1, wherein the first preset number is 2 and the second preset number is 8.

3. The method of claim 1, wherein performing primary interpolation comprises:
   calculating projection values for the first color window to obtain temporary interpolation values;
   determining the edge direction using the temporary interpolation values, based on the first preset number of directions; and
   performing primary interpolation on the first color, with respect to the first color window, based on the edge direction.

4. The method of claim 1, wherein estimating the edge direction comprises:
   calculating projection values for the second preset number of directions, with respect to the primary interpolated first color window; and
   estimating the edge direction using the projection values, based on the second preset number of directions.

5. A non-transitory computer-readable recording medium storing a program causing a processor to execute a process for edge-adaptive interpolation and noise filtering of an image, the process comprising:
   performing primary interpolation on a first color, based on a first preset number of directions, with respect to a first color window obtained from an input image window;
   estimating an edge direction within a primary interpolated first color window obtained by the primary interpolation, based on a second preset number of directions, the second preset number of directions being larger than the first preset number, with respect to the primary interpolated first color window;
   performing secondary interpolation on the first color, based on the estimated edge direction, with respect to the primary interpolated first color window; and
   performing interpolation on a second color, based on the estimated edge direction, with respect to a second color window obtained from the input image window,
   wherein performing the secondary interpolation comprises:
   setting a filter based on the estimated edge direction and an edge frequency; and
   performing the secondary interpolation on the first color, based on the estimated edge direction, by applying the filter to the primary interpolated first color window.

6. A portable terminal comprising:
   a non-transitory computer-readable recording medium storing a program causing a processor to execute a process for edge-adaptive interpolation and noise filtering of an image,
   wherein the process includes performing primary interpolation on a first color, based on a first preset number of directions, with respect to a first color window obtained from an input image window; estimating an edge direction within a primary interpolated first color window obtained by the primary interpolation, based on a second preset number of directions, the second preset number of directions being larger than the first preset number, with respect to the primary interpolated first color window; performing secondary interpolation on the first color, based on the estimated edge direction, with respect to the primary interpolated first color window; and performing interpolation on a second color, based on the estimated edge direction, with respect to a second color window obtained from the input image window, wherein performing the secondary interpolation comprises:

setting a filter based on the estimated edge direction and an edge frequency; and performing the secondary interpolation on the first color, based on the estimated edge direction, by applying the filter to the primary interpolated first color window.

* * * * *